June 3, 1969
J. R. KATCHKA ETAL
3,447,775
DIAPHRAGM VALVE CONTROL
Filed March 25, 1965
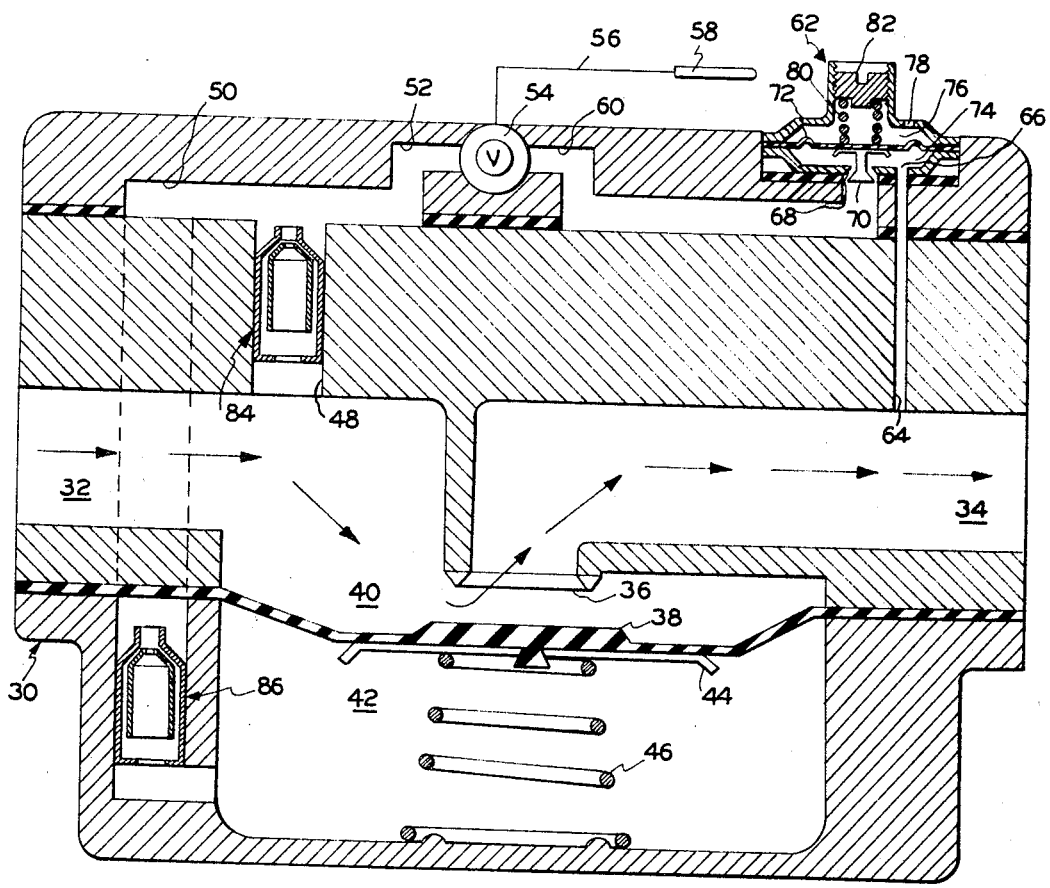
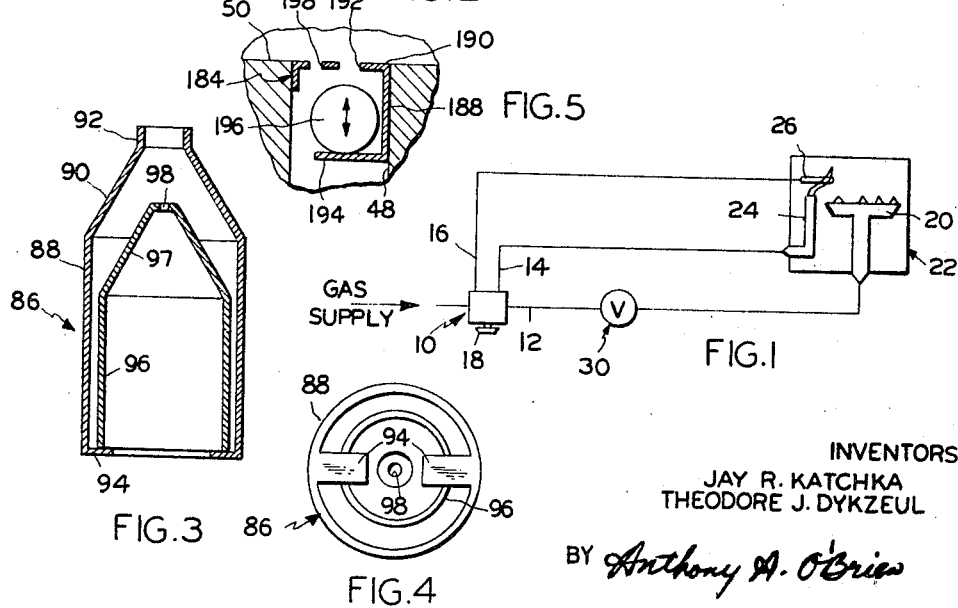
INVENTORS
JAY R. KATCHKA
THEODORE J. DYKZEUL
BY *Anthony A. O'Brien*
ATTORNEY United States Patent Office 3,447,775
Patented June 3, 1969

3,447,775
DIAPHRAGM VALVE CONTROL
Jay R. Katchka, Long Beach, and Theodore J. Dykzeul, Rolling Hills, Calif., assignors to Robertshaw Controls Company, Richmond, Va., a corporation of Delaware
Filed Mar. 25, 1965, Ser. No. 442,582
Int. Cl. F16k 31/165, 31/12, 31/36
U.S. Cl. 251—45                        3 Claims The present invention relates to a diaphragm valve control and in particular to such a control which effects operation of a diaphragm valve for controlling and regulating the flow of gas to the main burner of a heating device.

Conventional gas burner control devices have been confronted with the problem of roll out at the main burner caused by a rapidly opening control valve delivering maximum capacity to the main burner for ignition by the pilot burner and with the problem of flash back of the main burner flame caused by a slowly closing control valve. Solenoid operated and mechanically operated control valves have been provided with expensive and complex means for delaying valve opening movement, such as dashpots, and for accelerating valve closing movement, such as snap acting devices which bypass the dashpot operations. However, diaphragm valves are not easily adaptable to direct restraint of the valve opening as is used for slow opening on solenoid and mechanical valves or to the mechanisms effecting a quickclosing thereof.

It is, therefor, an object of the present invention to vary bleed line pressure which effects diaphragm valve operation in a control device.

Another object of the present invention is to secure slow opening and rapid closure of a diaphragm valve by varying the bleed line flow controlling such valve.

This invention has another object in that variable flow restricting means are disposed in the bleed line of a diaphragm valve.

It is another object of this invention to effect slow opening of a diaphragm valve by variably bleeding the medium exerting a closing pressure on the diaphragm valve.

It is another object of this invention to effect rapid closure of a diaphragm valve by increasing the flow area of a bleed line leading to the operating chamber of the diaphragm valve.

In practicing the present invention, a preferred embodiment is included in a control system for supplying a fuel flow to burner apparatus and comprises a casing having inlet and outlet passages, a diaphragm valve operatively disposed between the inlet and outlet passages, a bleed line for effecting operation of the diaphragm valve, control means movably disposed in the bleed line for controlling a bleed flow therethrough, and variable orifice means in the bleed line upstream of the control means whereby the bleed flow is varied in response to movement of the control means to effect a predetermined operation of the diaphragm valve.

Other objects and advantages of the present invention will become apparent from the following description of the preferred embodiment taken in connection with the accompanying drawing wherein:

FIG. 1 is a schematic diagram of a heating control system embodying this invention;

FIG. 2 is a vertical cross section of a control device utilized in FIG. 1;

FIG. 3 is an enlarged cross section of a detail from FIG. 2;

FIG. 4 is a bottom plan view of FIG. 3; and

FIG. 5 is a partial section view of a modified restrictor of FIG. 2.

With reference to FIG. 1 of the drawing, a heating control system includes a main control device 10 having an inlet conduit connected to a gas supply, a main flow outlet conduit 12, a pilot flow outlet conduit 14, a thermocouple connector lead 16, and a manual operator 18. The main flow outlet conduit 12 supplies a main flow of gas to the main burner 20 of a heating device 22 and the pilot flow outlet conduit 14 supplies a pilot flow of gas to a pilot burner 24 located in igniting proximity to the main burner 20. A thermocouple 26 is disposed in the flame of the pilot burner 24 and is connected to the lead 16 for controlling an electromagnetic safety valve (not shown) in the control device 10.

The above components of the heating control system are so well known in the art that structural details thereof are being omitted for the sake of brevity. In operation of the system of FIG. 1, the safety valve is manually opened (as by a reset button) to establish a pilot flow of gas to the pilot burner 24 which is ignited as by a match; safe lighting is accomplished by preventing flow to the main flow outlet 12 as by using a separate passage in control device 10 or by providing the manual operator 18 with a pilot position. As soon as the thermocouple 26 is heated, the reset button may be released since the safety valve will be held open by the electromagnet; the manual operator is then moved to its main control position whereupon gas flows through the conduit 12 to the main burner 20 which is ignited by the flame of the pilot burner 24. If for any reason the pilot burner flame is extinguished, the thermocouple will cool and deenergize the electromagnet, thus causing closure of the safety valve which is disposed adjacent the inlet of the control device 10 to cut off all flow of gas.

During normal operation of the heating control system in FIG. 1, the flow of gas to the main burner 20 is controlled by a valve device, indicated generally at 30, operatively disposed in the conduit 12 whereby the main burner gas flow is subject to pressure regulation and thermostatic on-off control.

As is illustrated in FIG. 2, the valve device 30 includes a casing having an inlet passage 32 and an outlet passage 34 separated by a valve seat 36. A flexible diaphragm defining a valve member 38 cooperates with the valve seat 36 to control the flow therethrough. The periphery of the diaphragm valve 38 is clamped between casing sections and its central part separates a hollow portion of the casing into an inlet pressure chamber 40 and an operating pressure chamber 42. The chamber 40 communicates with the inlet passage 32 so that the upper surface of the diaphragm valve is subject to inlet pressure. A back up plate 44 is secured to the lower surface of the diaphragm 38 and a coil spring 46 is mounted in compression between the bottom casing wall of chamber 42 and the back up plate 44 whereby the diaphragm valve 38 is biased toward the valve seat 36.

The casing of the control device 30 is provided with an internal bleed line arrangement including an inlet bleed passage 48 which communicates with the main flow inlet passage 32. The inlet bleed passage 48 has communication with parallel bleed passages, one such passage 50 leading to the operating pressure chamber 42 and the other passage 52 leading to a thermostatically operated valve 54. An operator (not shown) in the valve 54 is connected to one end of a capillary tube 56, the other end of which is provided with a thermal sensing bulb 58 that is suitably located in the space being heated by the heating device 22. In accordance with a desired temperature setting, the operator thermostatically cycles the valve 54 between on and off positions in response to temperature variations sensed by the thermal bulb 58. The downstream side of valve 54 communicates with a bleed passage 60 that leads to a bleed pressure regulator, indicated generally at 62; the downstream side of the pressure regulator 62 communicates with an outlet bleed passage 64 that leads to the main flow outlet passage 34 whereby the pressure regulator 62 senses main flow outlet pressure.

The pressure regulator 62 includes a housing having an outlet port 66 communicating with the outlet bleed passage 64 and a valve seat 68 communicating with the bleed passage 60. A diaphragm operated valve member 70 cooperates with the valve seat 68 for regulating bleed flow therethrough and is integrally formed with a stem and plate member, that is secured as by bonding to the undersurface of a flexible diaphragm 72. The diaphragm 72 separates the hollow portion of the regulator housing into two chambers; the lower chamber 74 communicates with the outlet port 66 and the valve seat 68, while the upper chamber 76 communicates with the atmosphere through an opened vent 78. A coil spring 80 in the upper chamber 76 is mounted in compression between the diaphragm 72 and an adjusting nut 82 threaded into the housing; the coil spring thus biases the valve member 70 away from the valve seat 68.

The pressure regulator 62 per se is a conventional item in the art so that specific details of operation are deemed unnecessary. In regulating the bleed line illustrated in FIG. 2, the pressure regulator 62 throttles the bleed gas flow to maintain a constant pressure at the outlet bleed passage 64. When the thermostatically operated valve 54 is opened, the bleed flow through the lower chamber 74 effects a pressure increase on the undersurface of diaphragm 72, causing the diaphragm to move in the direction of closing the valve member 70 against the valve seat 68. The vent 78 provides relief for the upper chamber 76 to maintain atmospheric pressure therein during movement of the diaphragm 72.

In operation of the system so far described, the bleed line controls the operation of the main diaphragm valve 38 which in turn controls the main flow of gas to the main burner 20. When the heating requirements in the space being heated are satisfied, the thermostatically operated valve 54 is closed and the bleed line passage 52 is cut off. A bleed flow of gas has a static path traced from the inlet passage 32 through the inlet bleed passage 48, thence through the first parallel bleed passage 50 to the operating pressure chamber 42; thus both sides of the diaphragm valve 38 are subject to inlet pressure and the biasing force of the coil spring 46 biases the diaphragm valve 38 against the valve seat 36 so there is no main flow of gas to the main burner 20. When there is a demand for heat as sensed by the thermal bulb 58, the thermostatically operated valve 54 is opened and thus the bleed line passage 52 is opened. The bleed flow of gas now has a dynamic path traced from the inlet passage 32 through the inlet bleed passage 48, thence through the second parallel bleed passage 52, the opened valve 54, the bleed passage 60, the pressure regulator 62 and the outlet bleed passage 64 to the main outlet passage 34. Upon opening of the bleed line, the gas in the pressure operating chamber 42 and in the first parallel bleed passage 50 is bled therefrom to the bleed passage 52, whereupon the pressure in the pressure operating chamber 42 is reduced and in the inlet pressure in chamber 40 moves the diaphragm valve member 38 against the bias of coil spring 46 to an open position whereby the main flow of gas is permitted to flow to the main burner 20 where it is ignited by the flame of the pilot burner 24.

In order to assure the pressure differential to open the main diaphragm valve upon opening of the thermostatically operated valve 54 in the bleed line, the inlet bleed passage 48 is provided with a flow restrictor device, indicated generally at 84, which has a restricting orifice furnishing the necessary pressure drop therethrough. A similarly constructed flow restrictor device, indicated generally at 86, is disposed in the first parallel bleed passage 50 adjacent to its opening into the operating pressure chamber 42. Inasmuch as the two flow restrictor devices 84 and 86 are identical in structure, only one will be described in detail.

As is illustrated in FIG. 3, the flow restrictor device 86 includes an outer shell having a cylindrical wall 88 of such diameter as to be press fitted into the bleed passage 50 (and 48) whereby the outer shell defines an insert fixed in such bleed passage; if desired, the outer shell of the restrictor 86 may be machined into the casting of the control device 10. The upper portion of the outer shell has a conical wall 90 which decreases in diameter and terminates with a smaller cylindrical wall 92. The outer shell is opened at both ends to permit flow therethrough and the lower end includes a pair of bottom wall tabs 94 extending radially inwardly from the end of the cylindrical wall 88. A movable inner shell as a cylindrical wall 96 of lesser diameter than the outer cylindrical wall 88 so as to be longitudinally movable therein; the lower end of the cylindrical wall 96 is retained in the outer shell by the bottom wall tabs 94. The upper portion of the inner shell has a conical wall 97 conforming to the decreasing taper of the outer conical wall 90. The inner shell is opened at both ends to permit flow therethrough and the upper end thereof includes an apertured top wall defining a restricting orifice 98. Athough the inner and outer shells have been illustrated with conical seating portions, it is to be understood that other shapes of seating constructions may be utilized.

FIG. 3 illustrates the assembly position of the inner shell and as soon as the main control device 10 is opened the flow restrictor devices 84 and 86 will move to appropriate restricting positions, if the valve 54 is opened. For example, the inner cylinder 96 floats within the outer cylinder 88 so that there are two flow paths, one interiorly through the inner shell and its orifice 98 and the other path exteriorly of the inner shell and through the outer shell and its orifice opening 92; the floating inner shell thus varies its position according to flow pressure and is movable to a flow check position such as a maximum flow restricting position as when the inner cone 97 seats against the outer cone 90. In its maximum flow restricting position, there is only a single flow path, i.e., through the restricted orifice 98.

The operation of the flow restrictor devices 84 and 86 will be described in relation to certain operating conditions of the system. Assuming that the main diaphragm valve 38 is closed and there is a demand for heat, the thermostatically operated valve 54 will be opened to open the bleed passage 52. Since the flow restrictor 84 has been moved to its maximum flow restricting position by inlet pressure in passage 48 (FIG. 2), the flow restrictor 84 effects the necessary pressure drop to cause bleeding of the pressure operating chamber 42. Thus the restrictor devices 84 acts as a check valve with respect to the bleed flow from inlet passage 48. Because of the pressure drop in passage 52, the flow restrictor device 86 provides variable bleeding of the chamber 42 because the pressure of the gas therein moves the inner shell of restrictor 86 from its floating positions to seat the inner cone 97 against the outer cone 90, which defines its maximum flow restricting position. Accordingly the pressure in the chamber 42 will be gradually reduced so that the diaphragm valve 38 is provided with a gradual opening movement. The two flow restrictors 84 and 86 are now positioned as illustrated in FIG. 2 with the main diaphragm valve 38 in its opened regulating position; when the bleed line pressures become equalized, the inner shell of the restrictor 86 will return to its floating position and the inner shell of the restrictor 84 will remain seated as shown in FIG. 2 because of the pressure drop between passages 48 and 52.

As soon as the heat requirements are satisfied, the thermostatically operated valve 54 is closed and the bleed line is cut off. The bleed passage 50 is then at a greater pressure than the chamber 42 whereby the inner shell of restrictor 86 is moved further away from its seating position and the bleed gas freely flows past the outer wall of inner shell 96 and then past the retaining tabs 94 into the chamber 42 to effect rapid closure of the diaphragm valve 38. Valve closure pressure is maintained in the chamber 42 because the flow restrictor 84 is always in communication with the inlet bleed passage. While the floating structure of flow restrictor 86 assures a rapid closure and slow opening of the main diaphragm, the flow restrictor 84 provides the added advantage of further increasing the rapid closure movement. For instance, when the thermostatically operated valve 54 closes, the pressure differential across the floating inner shell 96 of the restrictor 84 decreases causing the cone 97 to float from its seat 90 whereby a more rapid passage of inlet gas flows from bleed inlet passage 48 to bleed passage 50 to effect a more rapid closure of the main valve 38.

One or both of the flow restrictors 84 and 86 may be replaced with a ball check valve restrictor as is illustrated in FIG. 5. Only one ball check valve restrictor will be described in detail and its operation is the same as described above in connection with the shell type flow restrictors. In this instance, the ball check valve restrictor 184 includes an outer shell 188 press fitted into the inlet bleed passage 48 (and 50); the upper wall of the shell 188 has an opening 192 communicating with the bleed passage 50 and the lower end of the shell 188 includes a retaining tab member 194 which retains a floating ball check valve 196 within the shell 188. As is illustrated in FIG. 5, the bleed flow enters the lower end and passes out the upper wall of the shell 188. When the ball 196 is in its maximum upward position, the opening 192 is closed but a bleed flow is permitted through the smaller opening 198 which thus defines a bypass opening.

It is now apparent that the floating orifice check valves defined by the inner shells of the flow restrictors operate on pressure differentials generated within the system and no not require any external pressure source.

Inasmuch as the preferred embodiment of the present invention is subject to many modifications, variations and changes in details, it is intended that all matter contained in the foregoing description or shown on the accompanying drawing shall be interpreted as illustrative and not in a limiting sense.

What is claimed is:
1. In a control system for supplying a fuel flow to burner apparatus, the combination comprising
a casing having inlet and outlet means,
a diaphragm valve operatively disposed between said inlet and outlet means and defining a pressure operating chamber in said casing,
bleed line means for effecting operation of said diaphragm valve,
said bleed line means including an inlet bleed passage communicating with said inlet means, a first bleed passage between said inlet bleed passage and the pressure operating chamber and a second bleed passage between said inlet bleed passage and said outlet means,
valve means in said bleed line means controlling a bleed flow therethrough, and
floating variable orifice means operatively disposed in the inlet bleed passage of said bleed line means upstream of said valve means therein to vary a bleed flow therethrough and effect operation of said diaphragm valve,
said floating variable orifice means being operated in response to pressure differentials of the bleed flow.
2. In a control system for supplying a fuel flow to burner apparatus, the combination comprising
a casing having inlet and outlet means,
a diaphragm valve operatively disposed between said inlet and outlet means and defining a pressure operating chamber in said casing,
bleed line means for effecting operation of said diaphragm valve,
said bleed line means including an inlet bleed passage communicating with said inlet means, a first bleed passage between said inlet bleed passage and the pressure operating chamber and a second bleed passage between said inlet bleed passage and said outlet means,
valve means in said bleed line means controlling a bleed flow therethrough, and
floating variable orifice means operatively disposed in said bleed line means upstream of said valve means therein to vary a bleed flow therethrough and effect operation of said diaphragm valve,
said floating variable orifice means being operated in response to pressure differentials of the bleed flow and including a pair of variable orifices with one located in said inlet bleed passage and the other in said first bleed passage.
3. In a control system for supplying fuel flow to burner apparatus, the combination comprising
a casing having inlet and outlet means,
diaphragm operated valve means operatively disposed between said inlet and outlet means,
said diaphragm valve means including a valve member and a pressure operating chamber,
bleed line means having an inlet passage communicating with said inlet means and a bleed passage communicating with said inlet passage,
said bleed passage having a branch leading to the pressure operating chamber for effecting operation of said valve member and a second branch leading to said outlet means,
control means operatively disposed in said second branch for controlling a bleed flow therethrough, and
floating variable orifice means operatively disposed in said bleed line means upstream of said second branch for varying the bleed flow therethrough and effecting operation of said valve member,
said floating variable orifice means including an outer shell member and an inner shall floating member disposed therein.

References Cited

UNITED STATES PATENTS

| 1,144,657 | 6/1915 | Keller | 137—5137 |
| 1,878,001 | 9/1932 | Solon | 251—35 |
| 2,936,997 | 5/1960 | Nickells | 251—54 |
| 414,493 | 11/1889 | Chamberlain | 137—5133 X |
| 2,387,225 | 10/1945 | Beekley | 251—45 |
| 2,491,521 | 12/1949 | Samiran | 251—46 X |
| 2,991,796 | 7/1961 | Griswold | 137—489 |
| 3,145,056 | 8/1964 | Blahnik | 137—513.7 X |

FOREIGN PATENTS

| 1,20,003 | 6/1945 | Australia. |

M. CARY NELSON, Primary Examiner.

J. R. DWELLE, Assistant Examiner.

U.S. Cl. X.R.

137—489